W. WHALEY.
SHOVELING MACHINE.
APPLICATION FILED SEPT. 8, 1919.
1,379,428.
Patented May 24, 1921.
13 SHEETS—SHEET 8.
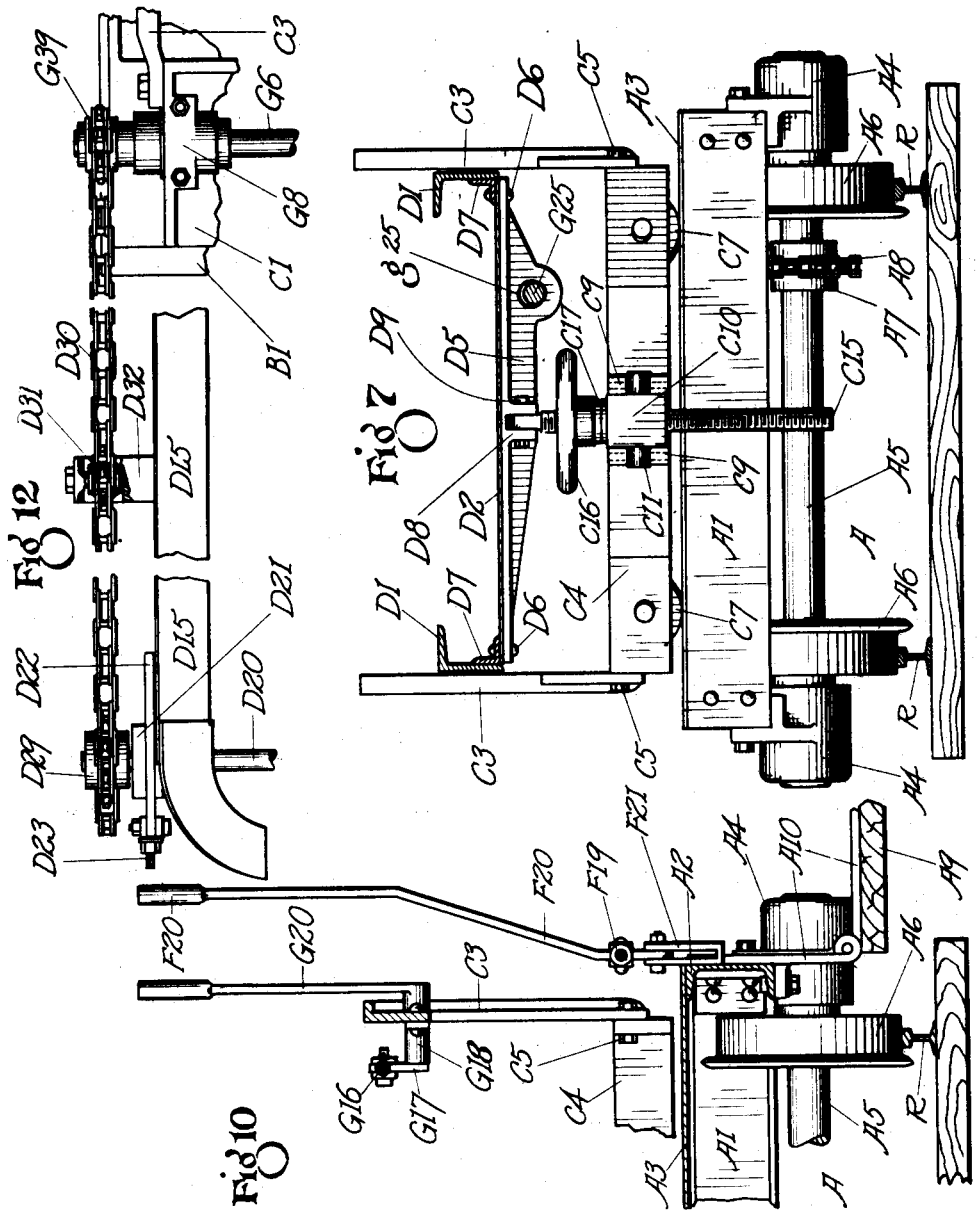
Inventor
William Whaley
By Cyrus Kehr
Attorney

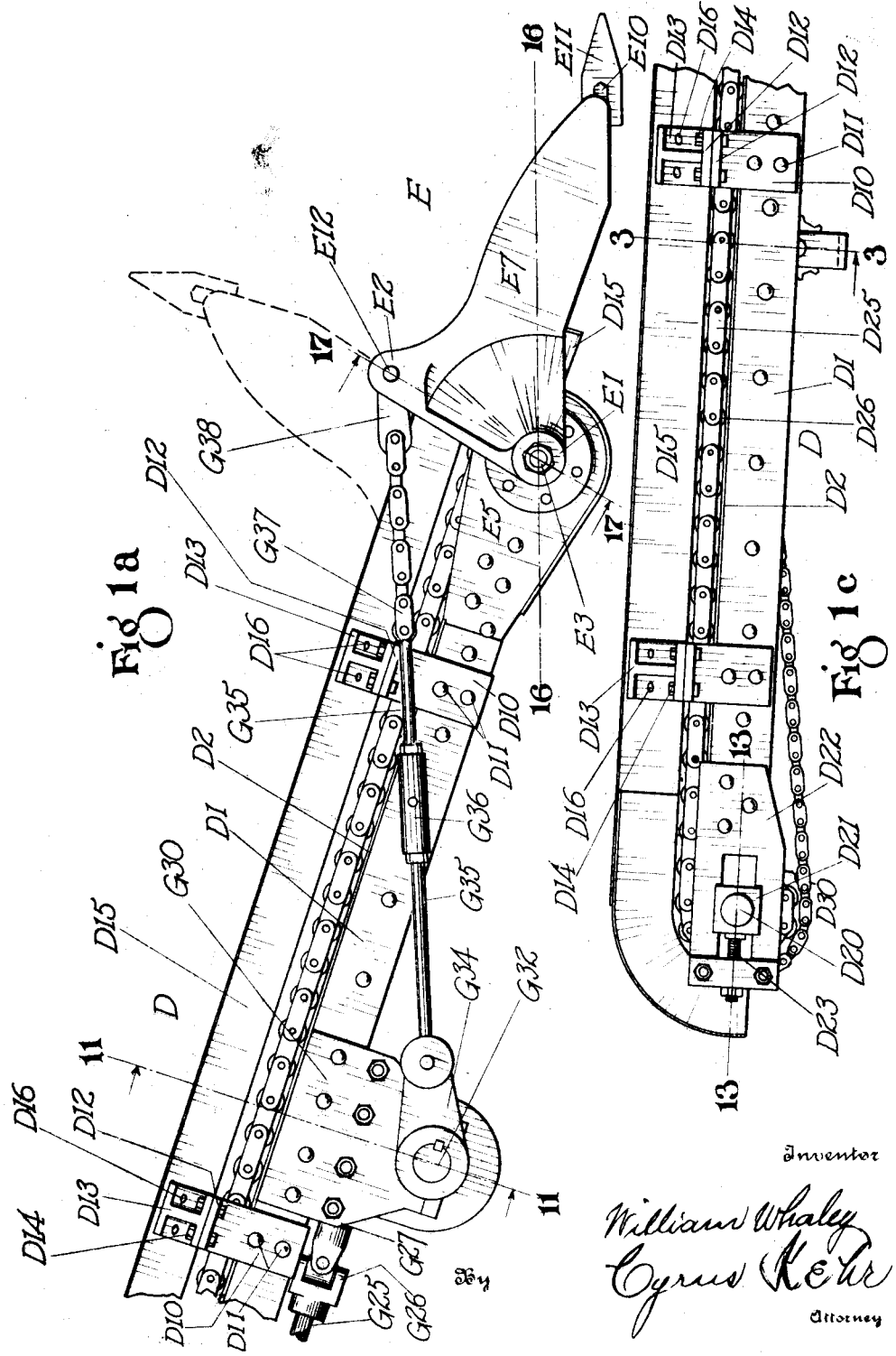

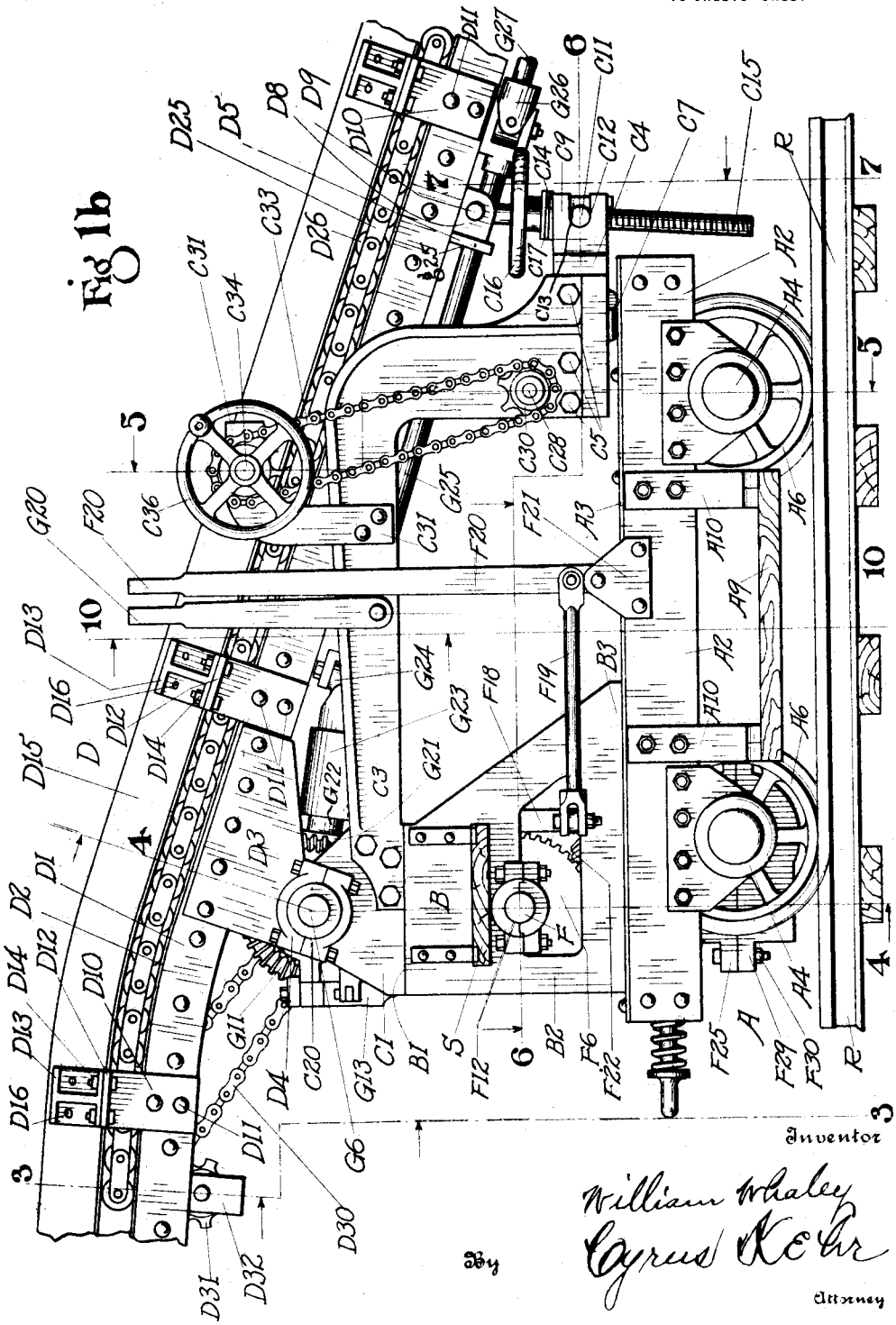

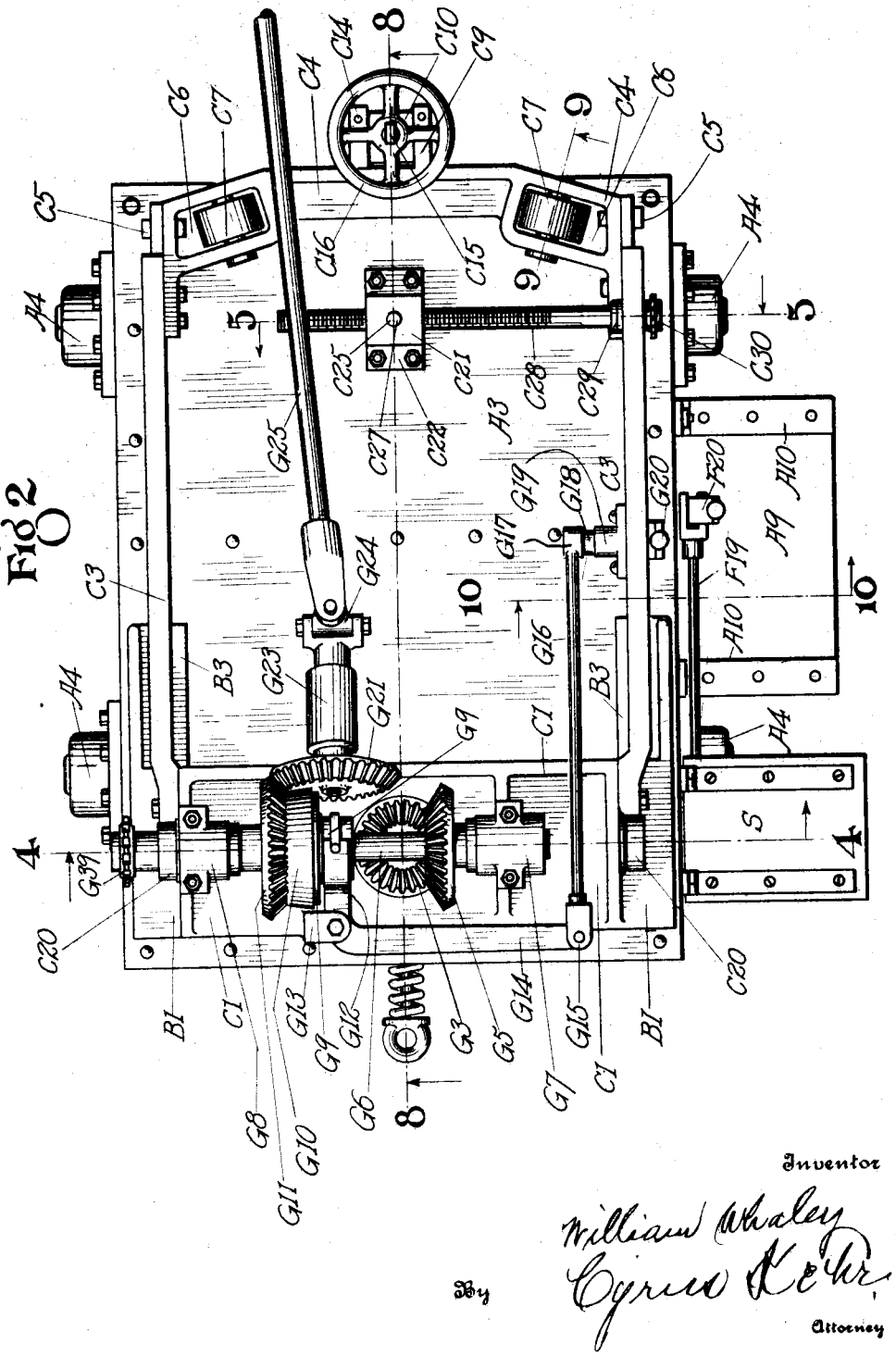

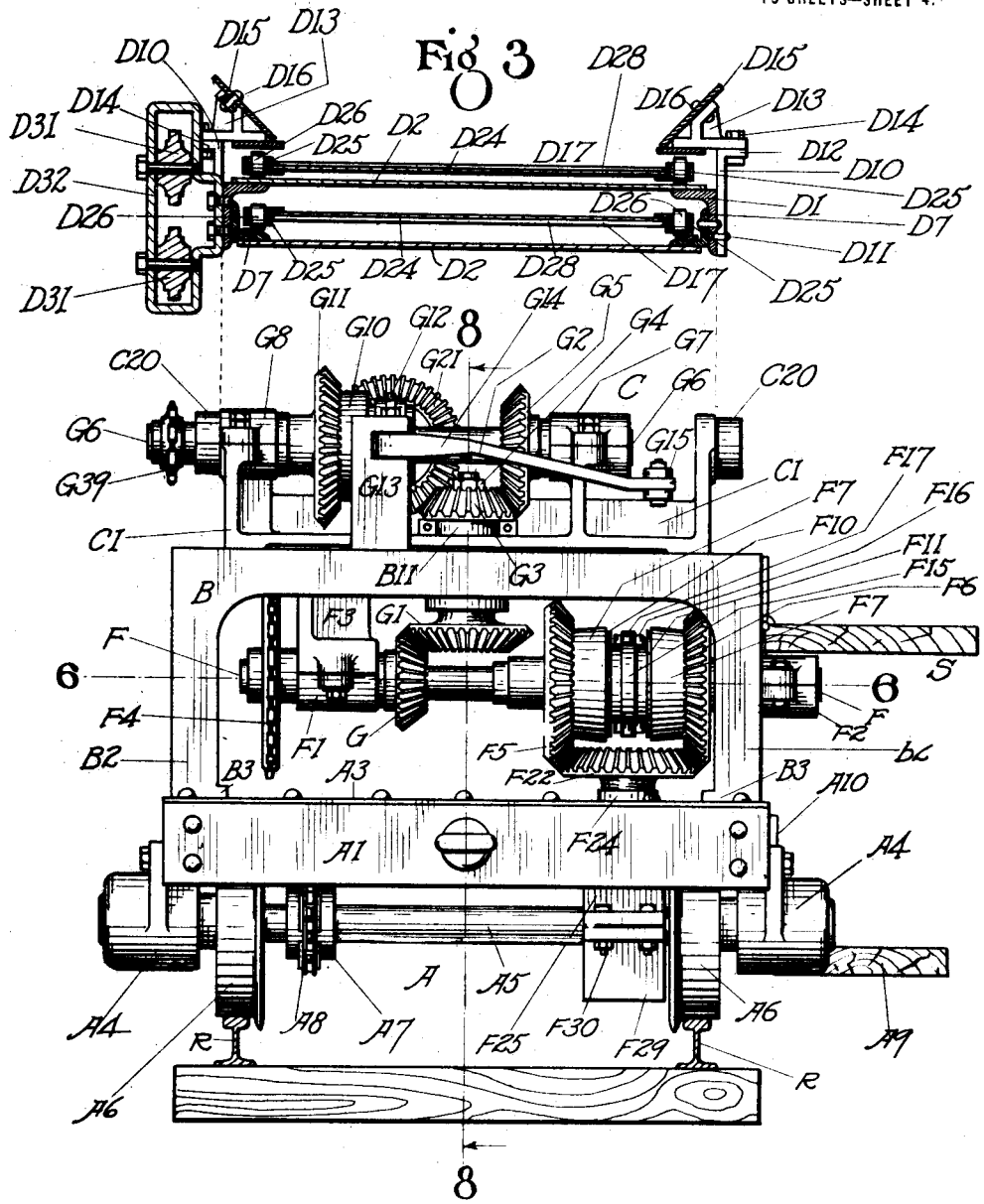

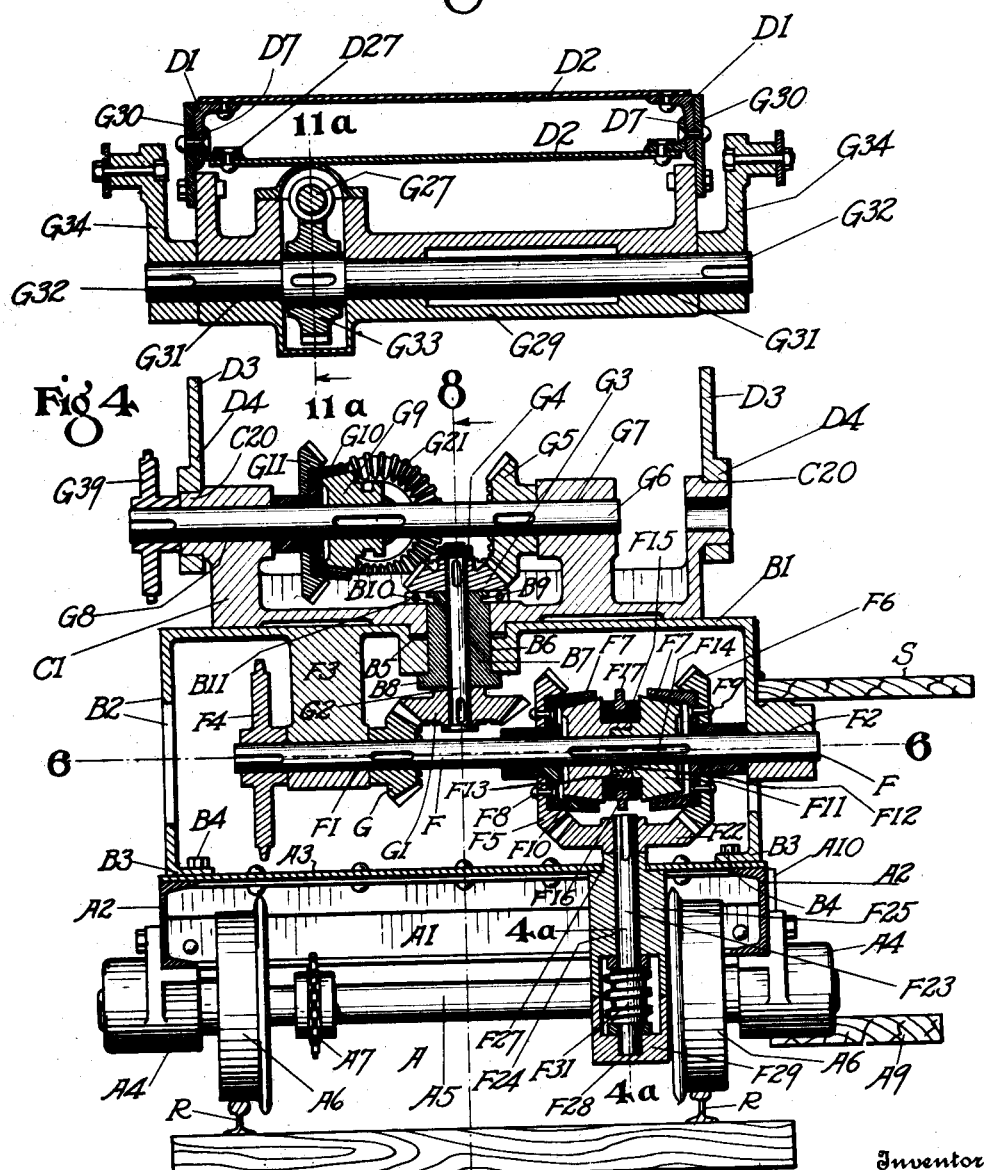

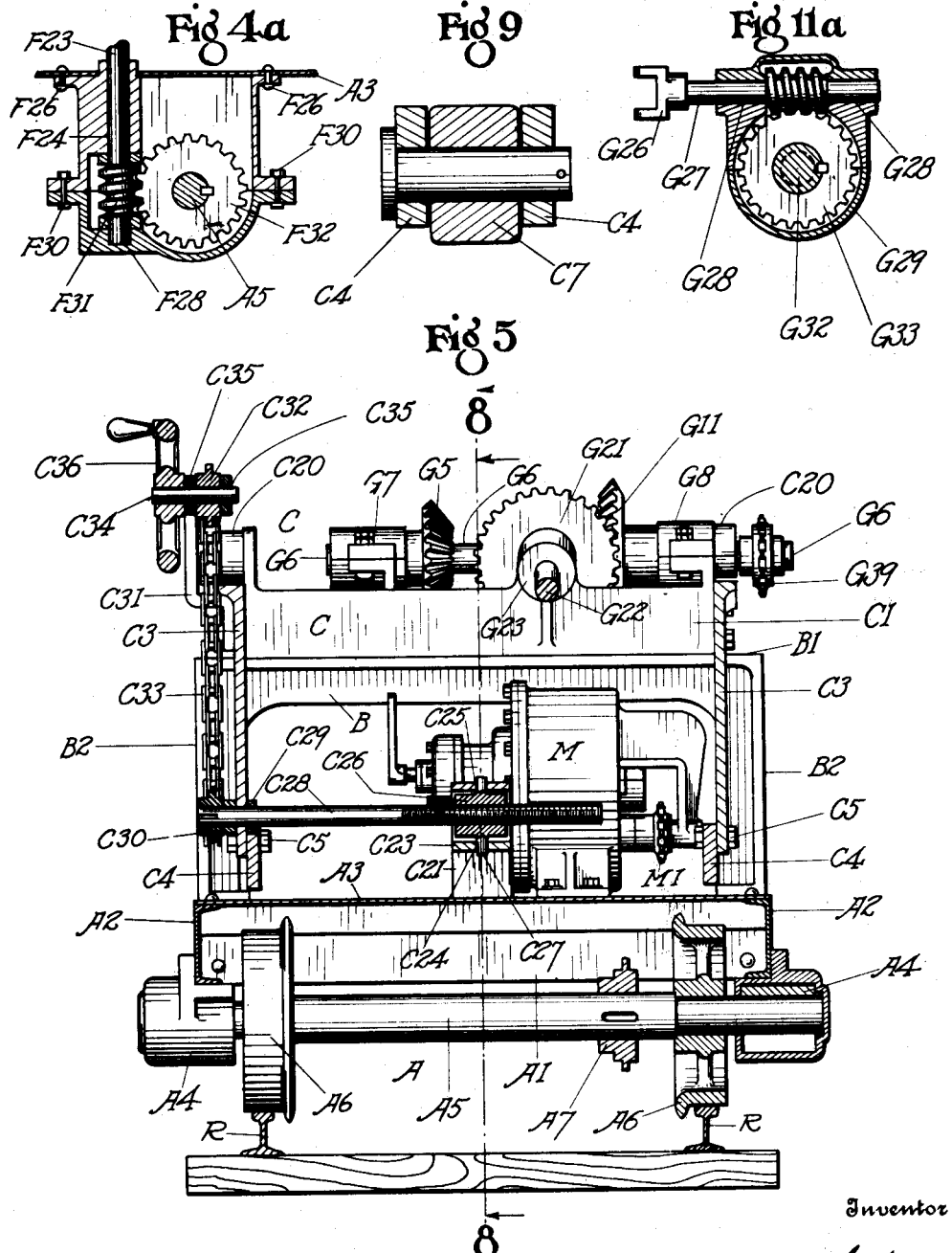

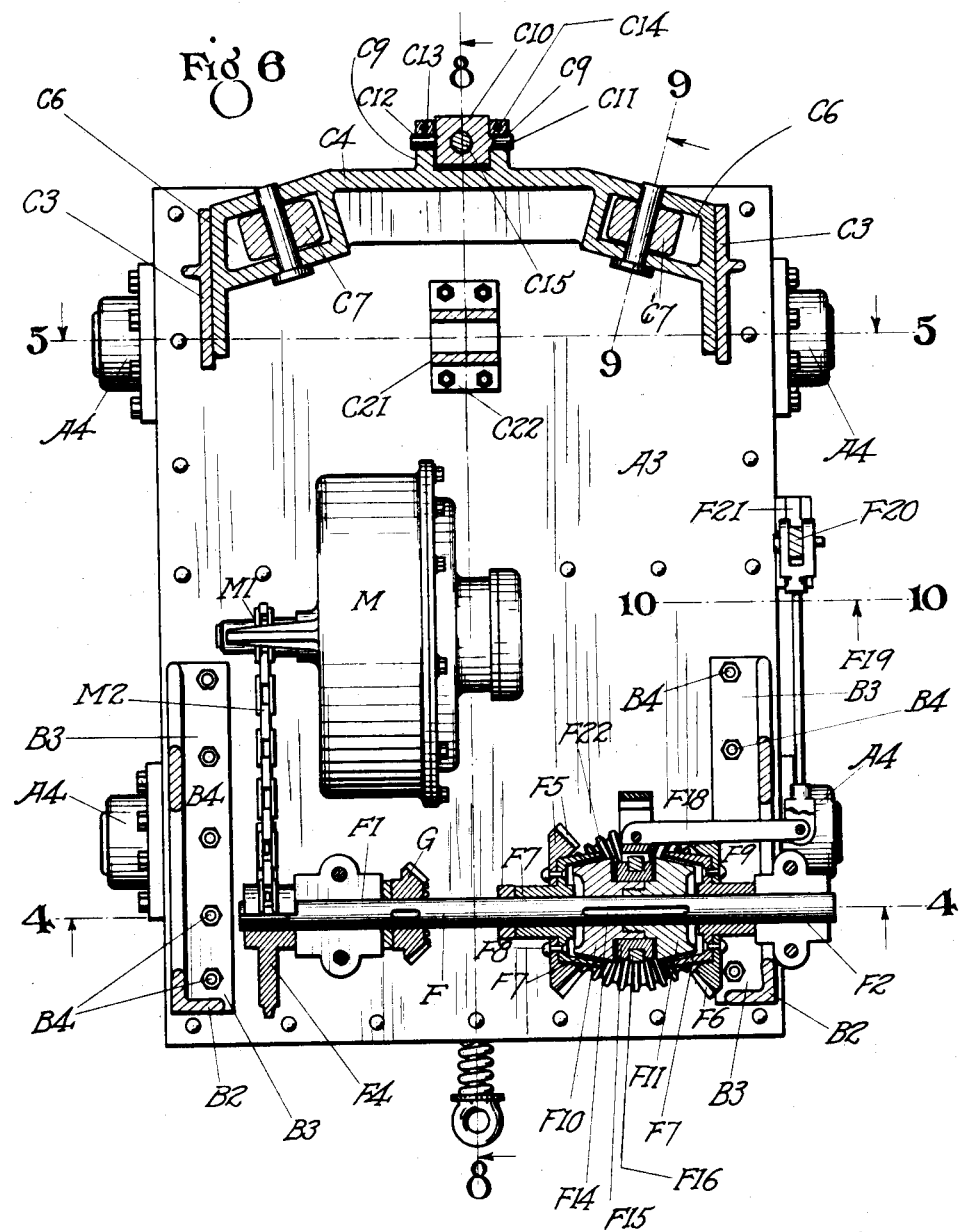

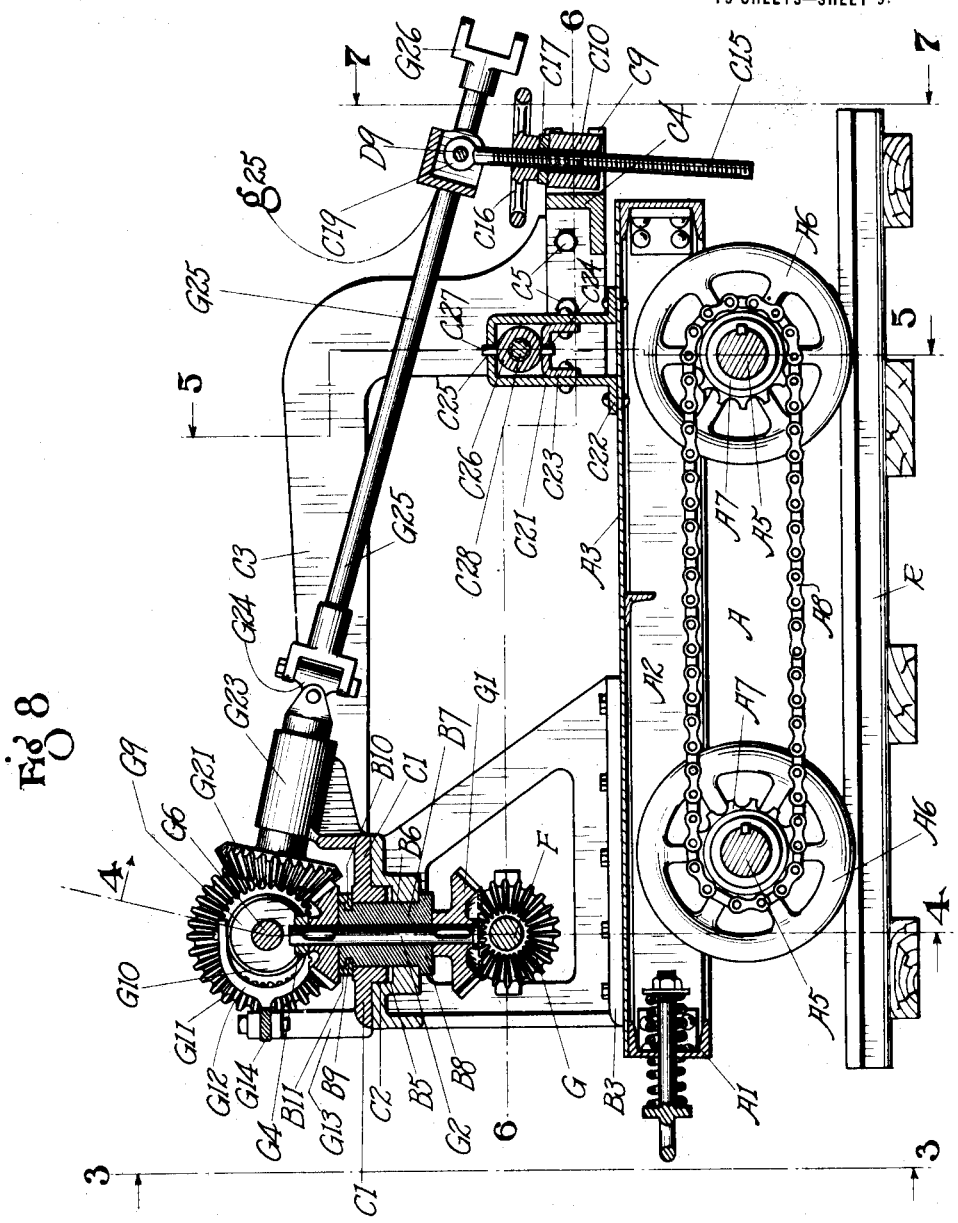

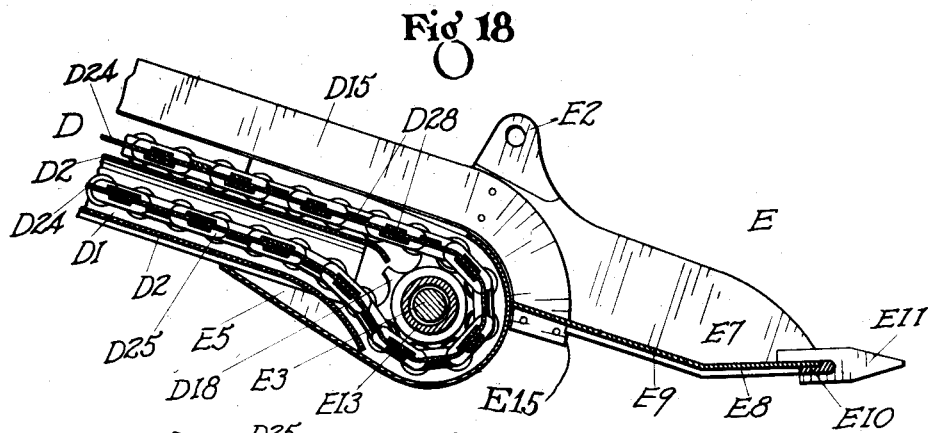
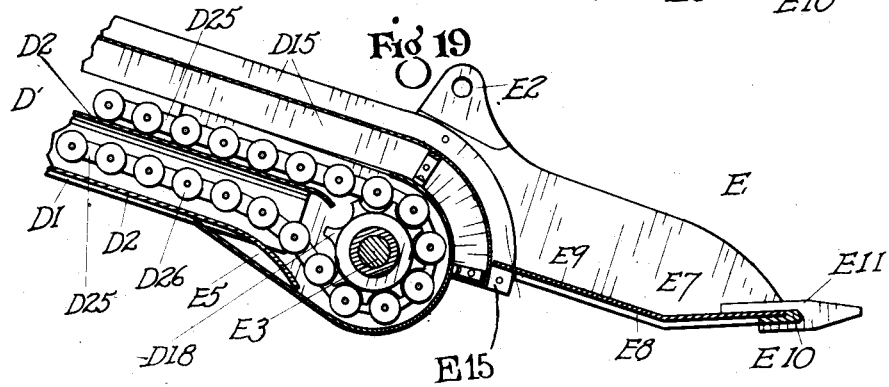
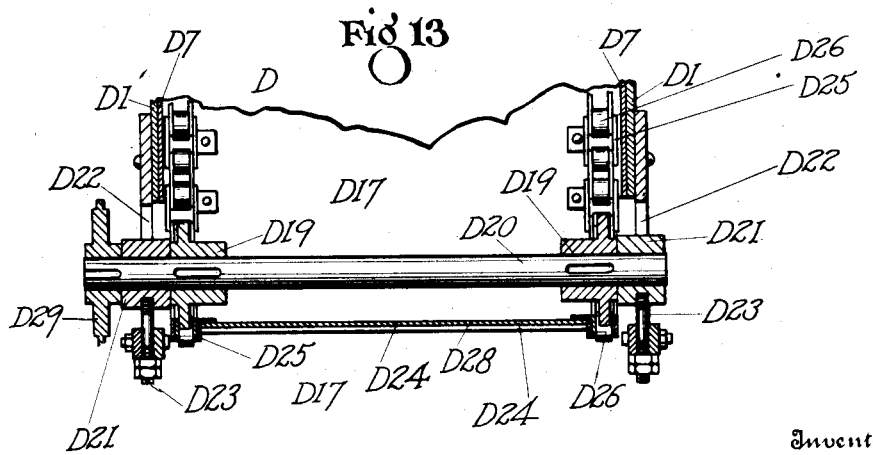

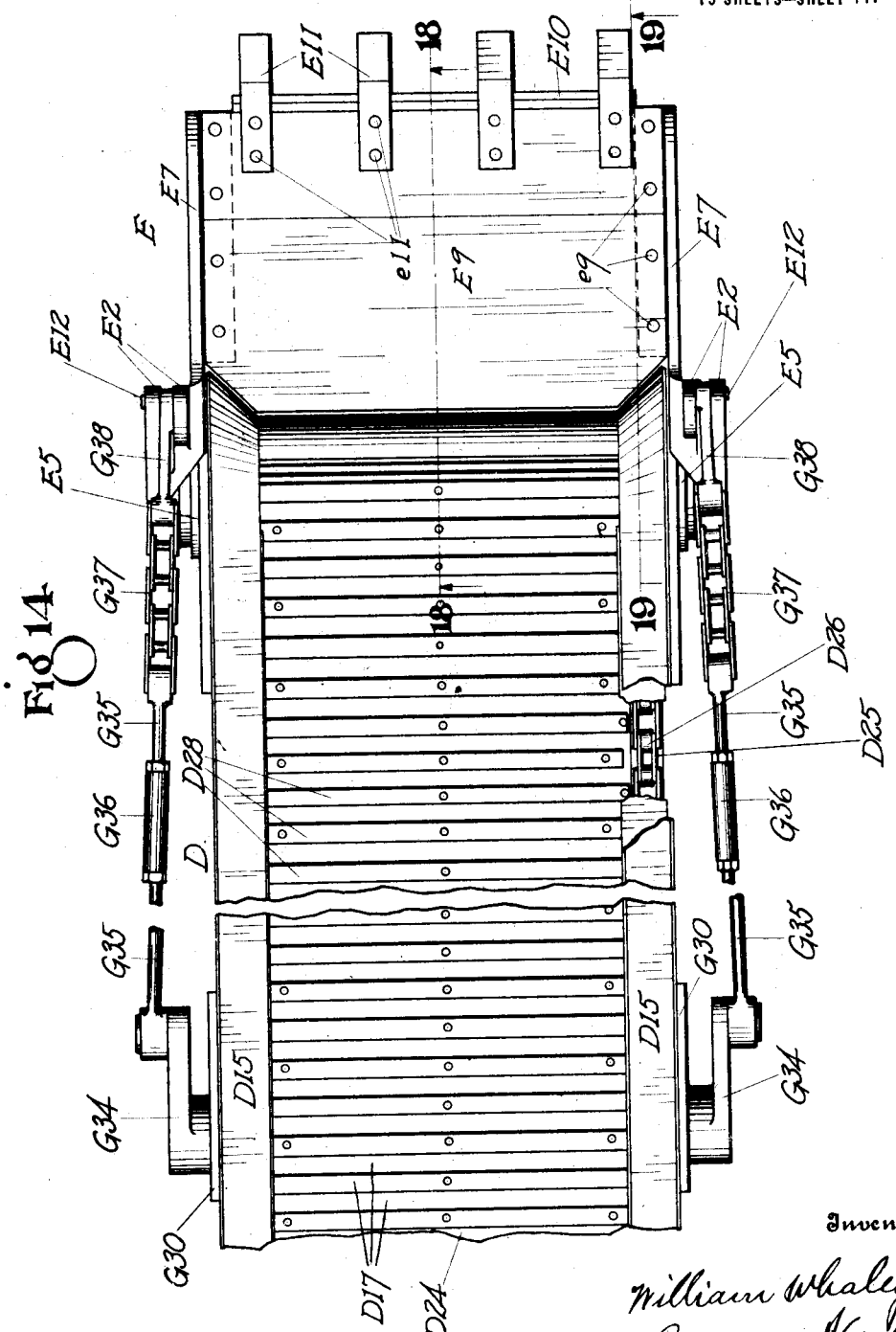

W. WHALEY.
SHOVELING MACHINE.
APPLICATION FILED SEPT. 8, 1919.
1,379,428.
Patented May 24, 1921.
13 SHEETS—SHEET 12.
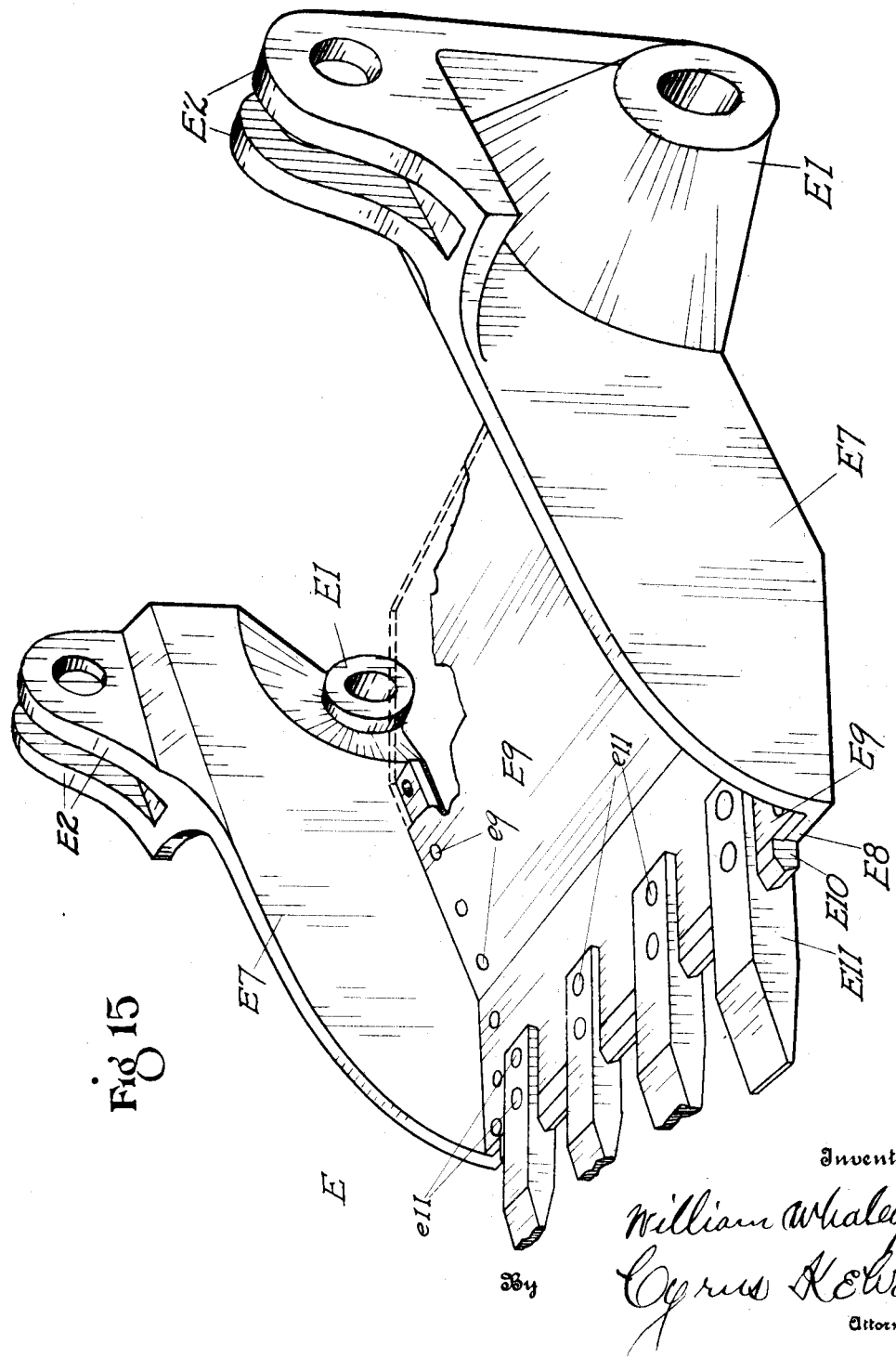

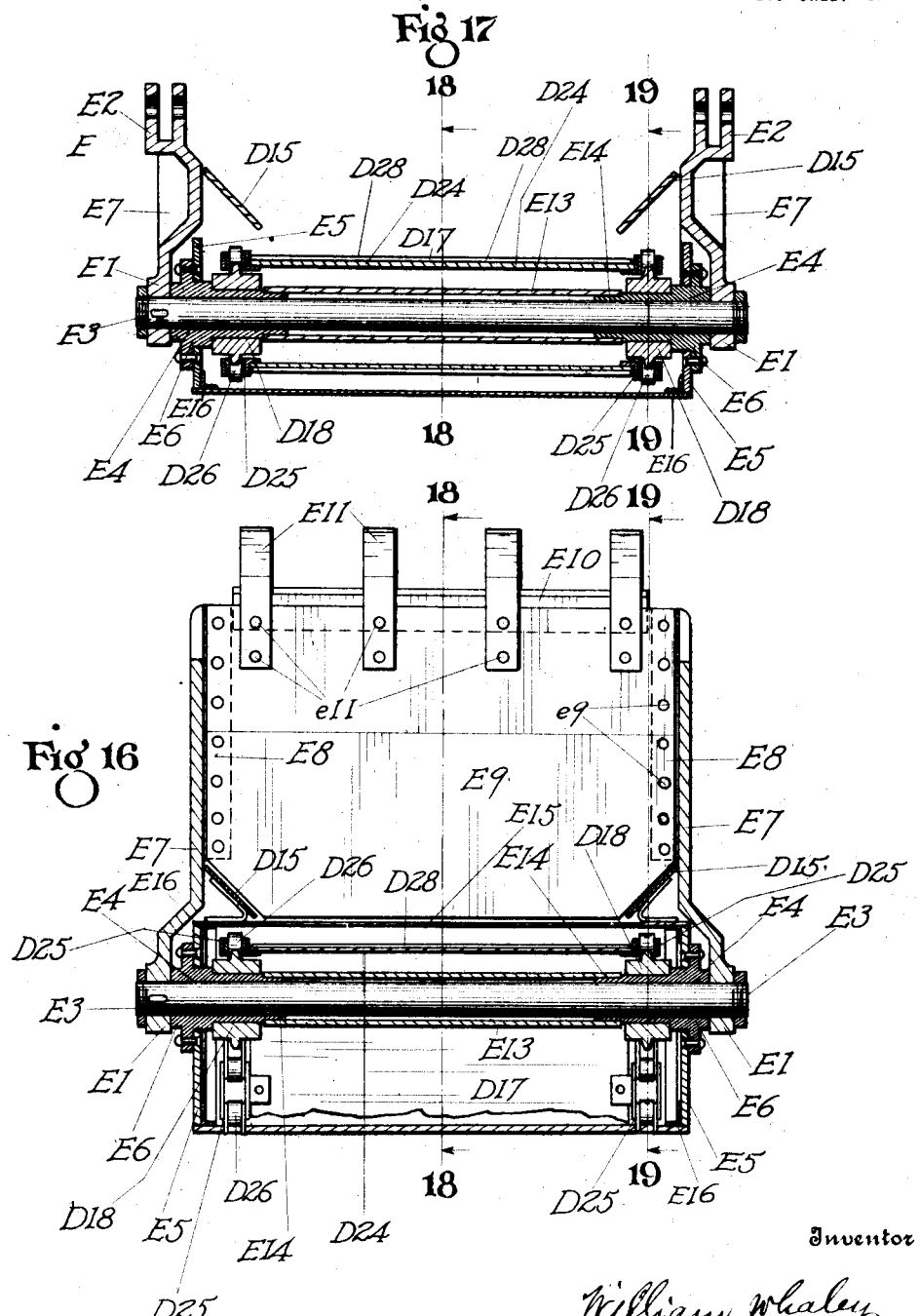

UNITED STATES PATENT OFFICE.

WILLIAM WHALEY, OF KNOXVILLE, TENNESSEE, ASSIGNOR TO SAID WILLIAM WHALEY, TRUSTEE.

SHOVELING-MACHINE.

1,379,428. Specification of Letters Patent. Patented May 24, 1921.

Application filed September 8, 1919. Serial No. 322,263.

*To all whom it may concern:*

Be it known that I, WILLIAM WHALEY, a citizen of the United States, residing at Knoxville, in the county of Knox and State of Tennessee, have invented a new and useful Improvement in Shoveling-Machines, of which the following is a specification, reference being had to the accompanying drawing.

My improvement relates particularly to shoveling machines comprising a conveyer and a shovel mechanism applied to the forward end of the conveyer to take up material and deliver it to the conveyer, the forward end of the conveyer being at the floor or ground level, and the rear end of the conveyer being elevated to facilitate discharge of material into a car or elsewhere.

The object of the invention is to produce such a machine in a form so simple as to allow the manufacture at moderate cost.

In the accompanying drawings,

Figure 1ª, Fig. 1ᵇ and Fig. 1ᶜ together present the right hand elevation of a machine embodying my improvement, Fig. 1ª showing the forward part, Fig. 1ᵇ the middle part and Fig. 1ᶜ the rear part of the machine;

Fig. 2 is a plan of the body of the machine, the conveyer having been removed, and the motor not being shown;

Fig. 3 is an upright transverse section on the line, 3—3, of Fig. 1ᵇ, looking forward;

Fig. 4 is a transverse upright section on the line, 4—4, of Fig. 1ᵇ, looking toward the right;

Fig. 4ª is a longitudinal upright section on the line, 4ª—4ª, of Fig. 4;

Fig. 5 is a transverse upright section on the line, 5—5, of Fig. 1ᵇ, looking toward the left, the motor being in position;

Fig. 6 is a horizontal section on the line, 6—6, of Fig. 1ᵇ, the motor being in position;

Fig. 7 is a transverse upright section on the line, 7—7, of Fig. 1ᵇ, looking toward the left;

Fig. 8 is a longitudinal upright section on the line, 8—8, of Figs. 2, 3, 4, 5 and 6, looking in the direction of the arrow;

Fig. 9 is an upright section on the line, 9—9, of Figs. 2 and 6, looking in the direction of the arrow;

Fig. 10 is an upright transverse section on the line, 10—10, of Figs. 2 and 6, looking in the direction of the arrow;

Fig. 11 is a transverse section on the line, 11—11, of Fig. 1ª, looking forward, the cranks being turned upward into the upright position;

Fig. 11ª is an upright longitudinal section on the line, 11ª—11ª, of Fig. 11;

Fig. 12 is a plan of the left hand part of the rear end of the conveyer, including mechanism for driving the rear shaft of the conveyer;

Fig. 13 is a horizontal section on the line, 13—13, of Fig. 1ᶜ;

Fig. 14 is a plan of the shovel and the part of the conveyer shown by Fig. 1ª;

Fig. 15 is a perspective of the shovel detached from the conveyer;

Fig. 16 is a horizontal section on the line, 16—16, of Fig. 1ª;

Fig. 17 is a transverse section on the line, 17—17, of Fig. 1ª, looking toward the right;

Fig. 18 is an upright section on the line, 18—18, of Fig. 14, looking in the direction of the arrow;

Fig. 19 is an upright section on the line, 19—19, of Fig. 14, looking in the direction of the arrow.

The machine consists of 5 principal sections or groups, (1) the truck, A, (2) the stationary superstructure, B, (3) the swiveled superstructure, C, (4) the conveyer, D, and (5) the shovel, E.

The truck comprises four ordinary car wheels, Aᶜ, adapted to rest on ordinary track rails, R. The superstructure, B, is stationary on the body of the truck. The rear part of the superstructure, C, is swiveled on an upright axis on the stationary superstructure, B, while its forward part rests on the forward part of the truck. The conveyer is hinged to the rear part of the superstructure, C, on an axis which is horizontal and transverse to the length of the conveyer. Adjusting mechanism is provided for supporting the conveyer forward of the horizontal axis whereby the conveyer may be tilted on said transverse hinge. The rear part of the shovel, E, is hinged to the forward end of the conveyer on an axis which is horizontal and transverse to the length of the conveyer. During operation, the entire machine is to be driven forward to force the shovel under the material. Then the shovel is to be turned on its axis, the forward end of the shovel going upward and rearward until the contents of the shovel slide onto the conveyer by gravity. This shovel movement and the bodily forward and backward movement of the machine are under the control of the operator, levers communicating with power mechanism arranged for this work.

The truck, A, has a rectangular frame comprising horizontal end pieces, $A^1$, and horizontal side pieces, $A^2$. Under the frame thus formed is placed a horizontal rectangular floor plate, $A^3$. To the side pieces, $A^2$, of the frame are applied bearings, $A^4$, which receive the ends of axles, $A^5$, to each of which are applied two track wheels, $A^6$. On each of the axles, $A^5$, is a sprocket wheel, $A^7$. To said wheels is applied a sprocket chain, $A^8$. Said chain compels rotation of the two wheels in unison. Rotation is imparted to one of said axles by means to be described further on, said means being under the control of the operator. The superstructure, B, has a flat rectangular top, $B^1$, extending transversely to the length of the machine and has upright end pieces, $B^2$, which rest upon the upper face of the rear part of the truck and are rigidly secured to the truck. Said end members have feet, $B^3$. Bolts, $B^4$, extend through said feet and the top plate, $A^3$. Midway between the ends of the superstructure, B, the top member of said structure has an annular socket, $B^5$. On the axial line of said socket and below the socket said member has a cylindrical aperture, $B^6$, in which rests a sleeve, $B^7$. On the lower end of said sleeve, is an annular flange, $B^8$, which bears upward against the lower face of the member, $B^1$.

The superstructure, C, is approximately rectangular and of nearly the horizontal dimensions of the truck. Said frame consists of a rear end piece, $C^1$, which is horizontal and transverse to the length of the machine and rests upon the upper horizontal face of the superstructure, B. The member, C, has at its middle a journal, $C^2$, extending downward into the socket, $B^5$. Said journal is apertured axially to allow the sleeve, $B^7$, to extend upward above the upper face of the member, $C^1$. Immediately above said face the sleeve, $B^7$, has an annular channel, $B^9$, into which extends the lip, $B^{10}$, of a split collar, $B^{11}$, which rests upon the upper face of the member, $C^1$. By means of said split collar and the annular flange, $B^8$, the sleeve, $B^7$, is held against upward or downward movement. The part of the sleeve, $B^7$, which rises through the socket, $B^5$, constitutes a journal for the member, $C^1$, said member being loose on said sleeve. The superstructure, C, has side pieces, $C^3$, which have their rear ends overlapping and secured to the ends of the member, $C^1$. From the member, $C^1$, the side pieces, $C^3$, extend forward nearly as far as the forward end of the truck and then they extend downward nearly to the upper face of the truck. The front end piece, $C^4$, extends horizontally across the front end of the truck and between the forward ends of the side pieces, $C^3$, and is secured to the latter by means of horizontal bolts, $C^5$. Near each end of the end piece, $C^4$, is an upright recess, $C^6$, extending through the end piece and receiving a roller, $C^7$, which is journaled on an axle which is horizontal and on a line extending radially from the axial line of the sleeve, $B^7$. Each of said rollers rests upon the upper face of the truck, A. Thus the movable superstructure, C, is adapted to have its forward part shifted sidewise in the arc of a circle, the center of which is in the axial line of the sleeve, $B^7$. All the parts, including the conveyer, supported by the superstructure, C, take motion with such movement of the superstructure. The chief purpose of such shifting is to shift the forward end of the conveyer laterally to give the shovel a lateral reach for its work.

Two hinge supports are provided for the conveyer frame on the rear part of the movable superstructure, C. On each end of the rear end member, $C^1$, is a journal, $C^{20}$, said journals being on a common axial line which is horizontal and transverse to the length of the machine. At each side of the conveyer frame is a downward-directed plate-form bracket, $D^3$, which has at its lower end a bearing, $D^4$, which receives the adjacent journal, $C^{20}$. By means of these journals and bearings a horizontal hinge is formed on which the conveyer frame may tilt when the screw shaft, $C^{15}$, (next described) is raised or lowered.

On the front of the end piece, $C^4$, are two arms, $C^9$, which are parallel to each other and directed forward at the same elevation. Between said arms is a block, $C^{10}$, which has trunnions, $C^{11}$, which are horizontal and located at opposite sides of the block and are seated in bearings, $C^{12}$, formed in the arms, $C^9$. For forming said bearings, each arm, $C^9$, is slotted from the front rearward and the slot made half around at the rear. Then a block, $C^{13}$, is inserted in the channel thus formed and secured by an upright bolt, $C^{14}$, extending downward through the arm, $C^9$, and the block, $C^{13}$. A screw shaft, $C^{15}$, extends loosely through the block, $C^{10}$. (See Figs. $1^b$, 2, 6 and 7. In Fig. 7, the blocks $C^{13}$, are omitted.) Above said block, said screw shaft is surrounded by a hand wheel, $C^{16}$, the hub of said wheel being interiorly screw threaded to conform to said screw shaft. To the lower face of the conveyer frame is applied a cross member, $D^5$, bolts, $D^6$, extending through the ends of said cross member and a flange of the angle member, $D^7$. At the middle of the cross member, $D^5$, are two downward-directed lugs, $D^8$, which form bearings for a cross pin, $D^9$, which extends through the head, $C^{19}$, of the screw shaft, $C^{15}$. By this means the screw shaft is coupled to the conveyer frame. The screw shaft forms one of the supports of the conveyer frame, and by turning said shaft up and down the forward end of the conveyer is raised and lowered.

The superstructure, C, is turned horizontally on its upright axis by means of screw mechanism which will now be described. Immediately at the rear of the forward end member, $C^4$, of the superstructure frame is a chain, $C^{21}$, which is in the form of an inverted U having feet, $C^{22}$, resting horizontally upon and secured to the floor plate, $A^3$, of the truck. Within the U-shape member is a cross piece, $C^{23}$, at the middle of which is an upright bearing, $C^{24}$, which is in alinement with a similar bearing, $C^{25}$, in the upper part of said chair. Between said bearings is a swivel block, $C^{26}$, which has trunnions, $C^{27}$, extending into the bearings, $C^{24}$ and $C^{25}$. Said swivel block is bored horizontally and interiorly screw threaded to receive a screw shaft, $C^{28}$, said shaft being horizontal and transverse to the length of the machine. And said shaft extends through the right hand side member, $C^3$, of the movable superstructure. At the inner side of the side member, $C^3$, the screw shaft has a shoulder, $C^{29}$. At the outer face of said side member the shaft is surrounded by and fixed to a sprocket wheel, $C^{30}$. On the horizontal part of the side frame member, $C^3$, is a standard, $C^{31}$, which supports a sprocket wheel, $C^{32}$. A sprocket chain, $C^{33}$, is applied to said two sprocket wheels. The sprocket wheel, $C^{32}$, surrounds and is fixed to a shaft, $C^{34}$, which is seated in bearings, $C^{35}$, formed in the standard, $C^{31}$. Said standard consists of a single forging having its lower end bolted to the member, $C^3$, and having its upper end bent horizontally into U-form to make a space for the sprocket wheel, $C^{32}$, and provide the bearings, $C^{35}$. On the right hand or outer end of the shaft, $C^{34}$, is a hand wheel, $C^{36}$. By turning said wheel, the screw shaft, $C^{28}$, is turned, and such turning forces the screw endwise in one direction or the other according to the direction in which the shaft is turned. Endwise movement of the shaft forces corresponding horizontal movement of the movable superstructure frame, the forward end of said frame being carried on the rollers, $C^7$. Since the conveyer frame is supported on the movable superstructure through the screw shaft, $C^{15}$, and the bearings, $D^4$, as above described, the conveyer frame moves laterally in unison with the movable superstructure frame.

The hand wheel, $C^{36}$, is located so as to be conveniently reached by the operator standing on the foot board, $A^9$, or seated on the seat, S, said seat projecting forward from the right-hand end of the stationary superstructure, B, and the foot board being secured to hangers, $A^{10}$, at the right hand side of the machine.

The main transmission mechanism is mounted in the stationary superstructure, B. A main drive shaft, F, rests in a bearing, $F^1$, and a bearing, $F^2$, the latter being formed on the right hand end wall of the superstructure, B, and the former being on a downward extension, $F^3$, cast integral with the superstructure. On the left hand end of said shaft is fixed a sprocket wheel, $F^4$, which receives motion from the motor, M, to be described further on. Within the right hand portion of the superstructure, B, the shaft, F, is surrounded by the cup members, $F^7$, of a double conical friction clutch, each of said clutch members being loose on the shaft. A bevel gear wheel, $F^5$, is associated with the left hand member, $F^7$, and riveted thereto by the rivets, $F^8$. A bevel gear wheel, $F^6$, is similarly associated with the right hand clutch member, $F^7$, rivets, $F^9$, securing the gear wheel to the clutch member. Within the clutch members, $F^7$, are two cone members, $F^{10}$ and $F^{11}$. The member, $F^{11}$, has a hub, $F^{12}$, which is screw threaded into the hub, $F^{13}$, of the member, $F^{10}$. The two hubs are channeled on the same line to receive a feather key, $F^{14}$, on the shaft, F. Thus the two cone sections are firmly joined to each other and the key, $F^{14}$, serves the double purpose of preventing the cone sections from turning independently of the shaft and from turning on each other for separation. A shift ring, $F^{15}$, surrounds the hubs of the cone members and the shifter fork, $F^{16}$, engages said ring through trunnions, $F^{17}$. (see Figs. 3 and 6). The fork, $F^{16}$, is rigid on the shift lever, $F^{18}$, which is of bell crank form and lies in a horizontal plane and extends through the right-hand end of the stationary superstructure and is there coupled to the rear end of the link, $F^{19}$, the forward end of which is coupled to the upright hand lever, $F^{20}$. The lower end of said lever is fulcrumed to the bracket, $F^{21}$, which is rigid on the right hand face of the truck frame member, $A^2$.

By shifting the cone members, $F^{10}$ and $F^{11}$, to the right or to the left, the corresponding clutch member, $F^7$, is engaged and made to rotate in unison with the shaft, F. The two bevel gear wheels, $F^5$ and $F^6$, are in mesh with a bevel gear wheel, $F^{22}$, which is located below the shaft, F, and fixed on an upright shaft, $F^{23}$, which rests in a bearing, $F^{24}$, which is a part of a housing casting, $F^{25}$, which is secured to the lower face of the floor plate, $A^3$, of the truck, A, by means of upright bolts, $F^{26}$, the bearing, $F^{24}$, extending upward through an aperture, $F^{27}$, formed in the floor plate, $A^3$. The lower end of the shaft, $F^{23}$, rests in a step bearing, $F^{29}$, formed in a lower housing section, $F^{29}$, which is secured to the upper housing section by upright bolts, $F^{30}$. Above the bearing, $F^{28}$, a gear worm, $F^{31}$, is formed integral with the shaft, $F^{23}$. The truck axle, $A^5$, extends through the housing adjacent the worm, $F^{31}$, and a worm wheel, $F^{32}$, surrounds and is fixed to said axle in position to be engaged by the worm, $F^{31}$. Thus the rotation of the shaft, $F^{23}$, will cause the rotation of the axle, $A^5$. Since the gear wheels, $F^5$ and $F^6$, are in engagement with the bevel gear wheel, $F^{22}$, said wheel will receive rotation in one direction or the other whenever one of the wheels, $F^5$ and $F^6$, is made to rotate in unison with the shaft, F.

The chief members of the frame of the conveyer, D, are the two side rails, $D^1$, the angle members, $D^7$, and the transverse body plates, $D^2$, the side rails, being of angle form in cross section and having one flange applied flatwise to the lower face of the body plate and having the other flange directed downward. To the inner face of each upright flange is applied one flange of an angle member, $D^7$, said angle member being parallel to the rail, $D^1$, and having one flange directed horizontally toward the opposite edge of the frame. To the lower faces of said horizontal flanges is attached a transverse body plate, $D^2$, which is like the body plate, $D^2$, supported by the side rails, $D^1$. Standard plates, $D^{10}$, are applied flatwise to the outer face of the side rails, $D^1$, and secured to said rails by rivets or bolts, $D^{11}$. The upper end of each of said plates has an outward horizontal extension, $D^{12}$, on which rests a chair, $D^{13}$, which is secured by bolts, $D^{14}$, extending through said chair and said extension. The inner ends of the chairs, $D^{13}$, support a plate, $D^{15}$, which extends lengthwise of the conveyer and is inclined transversely, the lower edge being close to the endless apron, $D^{17}$. Rivets, $D^{16}$, extend through the plate, $D^{15}$, and the chair, $D^{13}$, to secure said parts to each other.

At the forward end of the conveyer the endless apron extends around rollers, $D^{18}$, on the horizontal trunnions, $E^6$, surrounding the shaft, $E^3$. At the rear end of the conveyer the endless apron extends around rollers, $D^{19}$, on the shaft, $D^{20}$. (Figs. 13 and 16).

Said shaft rests in bearing blocks, $D^{21}$, which are slidable endwise on guideways, $D^{22}$. By means of adjusting bolts, $D^{23}$, said slide blocks may be moved parallel to the length of the conveyer for varying the tension of the endless apron.

The endless apron, $D^{17}$, may be of any desired form. In the form shown in the drawings, the apron consists of a fabric sheet, $D^{24}$, marginal apron chains, $D^{55}$, and transverse ribs, $D^{28}$, the ribs being applied to the face of the fabric sheet and the chains comprising rollers, $D^{26}$, which, in their upper course, rest on the upper body plate, $D^2$, and which, on the lower course, rest on wearing strips, $D^{27}$, which are supported on horizontal flanges of the angle members, $D^7$. The rollers, $D^{18}$ and $D^{19}$, have sprocket teeth to engage the chains, $D^{25}$. The apron is driven by applying power to the rear conveyer shaft, $D^{20}$, as will be described further on.

On the shaft, F, at the left of the bevel gear wheel, $F^5$, a bevel gear wheel, G, surrounds and is fixed to the drive shaft, F. Said wheel meshes with a bevel gear wheel, $G^1$, which surrounds and is fixed to the shaft, $G^2$, which is rotatable in the upright sleeve, $B^7$, already described as joining the movable structure, C, to the stationary superstructure, B, (Figs. 8 and 11.) The wheel, $G^1$, bears upward against the lower end of said sleeve. The shaft, $G^2$, extends upward through said sleeve and its upper end is surrounded by a bevel gear wheel, $G^3$, which is fixed to said shaft and rests upon the upper end of the sleeve. A nut, $G^4$, surrounds the shaft, $G^2$, above the wheel, $G^3$. The wheel, $G^3$, meshes with the bevel gear wheel, $G^5$, which surrounds and is fixed to the horizontal shaft, $G^6$, which has its right hand end in a bearing, $G^7$, and has its left hand portion in a bearing, $G^8$. At the left of the wheels, $G^3$ and $G^5$, the shaft $G^6$, is surrounded by the cone member, $G^9$, of a clutch. Said member is feathered on said shaft to permit endwise movement of the member and to compel rotation with the shaft. The cup member, $G^{10}$, of the clutch receives the member, $G^9$. The cup member and the bevel gear wheel, $G^{11}$, are joined to each other and loosely surround said shaft, $G^6$. A clutch fork, $G^{12}$ (Figs. 2, 3 and 8), is applied to said cone member and is supported by the horizontal bell crank, $G^{14}$, which is pivoted to the bracket, $G^{13}$, which is supported by the superstructure, C. The long arm of the bell crank extends toward the right and to it is coupled, at $G^{15}$, the rear end of a horizontal connecting rod, $G^{16}$, the forward end of which is coupled to the upper end of a rocking arm, $G^{17}$, which is rigid on a rock shaft, $G^{18}$, which rests in a bearing, $G^{19}$. On the opposite end of said rock shaft is an upright hand lever, $G^{20}$, which is near the hand lever, $F^{20}$, and convenient to the seat, S, and the foot board, $A^9$.

By tilting the lever, $G^{20}$, the cone member, $G^9$, may be shifted to engage the cup clutch member, $G^{10}$, to compel rotation of the bevel gear wheel, $G^{11}$, with the shaft, $G^9$.

The bevel gear wheel, $G^{11}$, engages a bevel gear wheel, $G^{21}$, which surrounds and is fixed to the rear end of a shaft, $G^{22}$, which extends through a bearing, $G^{23}$, which is supported on the superstructure, C. Forward of the shaft, $G^{22}$, is a rotary longitudinal shaft, $G^{25}$, which has its rear end joined to the forward end of the shaft, $G^{22}$, by a universal coupling, $G^{24}$. The forward end of the shaft, $G^{25}$, extends loosely through an aperture, $g^{25}$, formed in the cross member, $D^5$, (Fig. 7) said aperture being large enough to allow for up and down movement of said shaft during adjustment of the conveyer by means of the screw shaft, $C^{15}$. Forward of the end of the shaft, $G^{25}$, is a worm shaft, $G^{27}$, which is parallel to the length of the conveyer and is joined to the shaft, $G^{25}$, by a universal coupling, $G^{26}$. Said worm shaft, $G^{27}$, rests in bearings, $G^{28}$, formed in the worm gear and shaft casing, $G^{29}$, which is secured to the conveyer frame by depending bracket plates, $G^{30}$. A horizontal transverse shaft, $G^{32}$, extends through the casing, $G^{29}$, and rests in bearings, $G^{31}$, formed in said casing. On said shaft is a worm gear wheel, $G^{33}$, which is engaged by the worm of the worm shaft, $G^{27}$. Each end of said shaft projects beyond the adjacent bearing and has rigidly applied thereto a crank, $G^{34}$. The shovel, E, has at its rear end and at each side of the conveyer a lower ear, $E^1$, and an upper ear, $E^2$. A shaft, $E^3$, extends horizontally through the ears, $E^1$, and through bearings, $E^4$, in the forward end of the conveyer frame. Thus the shovel is hinged to the conveyer frame.

At each side of the conveyer is a pitman rod, $G^{35}$, which has its rear end coupled to the crank, $G^{34}$. To the forward end of each of said rods is attached a chain, $G^{37}$, and said chain is attached to a short bar, $G^{38}$, which is coupled to the ear, $E^2$, of the shovel. On each pitman rod is a turn buckle, $G^{36}$, by which said rod can be lengthened or shortened.

When the hand lever, $G^{20}$, is set to close the clutch, $G^9$, $G^{10}$, motion is transmitted through the shafts, $G^{25}$ and $G^{32}$, and the cranks, $G^{34}$; and the movement of the cranks causes the endwise movement of the pitman rods, $G^{35}$, whereby the upper ears, $E^2$, of the shovel are drawn rearward and again allowed to move forward. By this movement the shovel is tilted on the shaft, $E^3$, the nose of the shovel, rising until the floor of the shovel is sufficiently steep to allow material resting thereon to slide downward and rearward to the conveyer.

The shovel will be described in detail further on.

On the left hand end of the shaft, $D^{20}$, is fixed a sprocket wheel, $D^{29}$. On the left hand end of the shaft, $G^6$, which is mounted on the rear end of the superstructure, C, as already described, is fixed a sprocket wheel, $G^{39}$. (See Figs. 2, 4, 5, 12 and 13.) A sprocket chain, $D^{30}$, is applied to said sprocket wheel and the sprocket wheel, $D^{29}$. The course of said chain is deflected by two idle sprocket wheels, $D^{31}$, supported on a bracket, $D^{32}$, which is secured to the conveyer frame. When the shaft, $G^6$, is driven, the sprocket wheel, $G^{39}$, is rotated, whereby the sprocket chain, $D^{30}$, is driven. That causes the rotation of the sprocket wheel, $D^{29}$, and the shaft, $D^{20}$, and thereby the conveyer apron is driven.

The motor, M, is seated upon the horizontal floor plate, $A^3$, of the truck in front of the stationary superstructure, B, and has a sprocket wheel, $M^1$, which is rotated when the motor is in action. A sprocket chain, $M^2$, engages said wheel and the sprocket wheel, $F^4$, on the drive shaft, F, for the transmission of power from the motor to the drive shaft.

The shovel will now be further described. The bearings, $E^4$, wherein the shaft, $E^3$, rests are secured to upright side plates, $E^5$, which are attached to the outer faces of the forward parts of the side rails, $D^1$, of the conveyer (Figs. 1a, 14, 16 and 17). The inner end of each bearing, $E^4$, forms a trunnion, $E^6$, for one of the rollers, $D^{18}$, which rollers support the forward end of the endless apron, as already described. To give greater stability to the forward end of the conveyer frame, a tube, $E^{13}$, surrounds the shaft, $E^3$, and has its ends fitted around extensions, $E^{14}$, of the trunnions, $E^6$, the extensions, $E^{14}$, being of smaller diameter than said trunnions, in order that a part of each trunnion may bear against the adjacent end of the tube.

As shown by Figs. 15, 16 and 17, the ears, $E^1$, are extended outward horizontally along the shaft, $E^3$, and said shaft extends through said ears and is keyed to the latter, so that the shaft and the shovel will turn in unison on the axial line of the shaft. The slanting plates, $D^{15}$, of the conveyer are curved forward and downward concentric to the shaft, $E^3$, as shown in Figs. 18 and 19, the extension of said plate being continued lower than the lowest position of the shovel floor, $E^9$, (Figs. 18 and 19).

The shovel is composed of upright side castings, $E^7$, a floor, $E^9$, a reinforcing bar, $E^{10}$, and teeth, $E^{11}$. Each of the side castings has one lower ear, $E^1$, and a pair of upper ears, $E^2$, and has on its inner face and along its lower edge a horizontal rib, $E^8$, which supports one of the side edges of the floor, $E^9$, the floor being secured to said ribs, by rivets or bolts, $e^9$. The reinforcing bar, $E^{10}$, extends along the front edge of and beneath the shovel floor. The teeth, $E^{11}$, extend over said bar and a part of the shovel floor and are secured by rivets or bolts, $e^{11}$.

The forward edges of the side plates, $E^5$, which support the bearings, $E^4$, are curved to make said edges concentric with the shaft, $E^3$, the axis of which is also the axis upon which the shovel turns. A guard plate, $E^{15}$, is curved to conform to the forward edges of the side plates, $E^5$, and is wide enough to reach from one plate, $E^5$, to the other. At each plate, $E^5$, a curved angle bar, $E^{16}$, is placed along the meeting edges of the plate, $E^5$, and the guard plate, and used for joining said plates to each other. The guard plate extends between the forward part of the conveyer apron and the rear edge of the shovel floor, $E^9$, said plate being clear of said apron and almost touching the rear edge of the shovel floor. Since the forward edges of the side plates, $E^5$, are concentric with the shaft, $E^3$, the guard plate is also concentric with said shaft; and since the shovel is hinged on the shaft, the rear edge of the shovel moves in a path which is concentric to said shaft. And the guard plate presents a smooth surface, while the conveyer apron has the transverse ribs. Hence during the movements of the shovel, the rear edge of the shovel floor keeps close to the guard plate, and all material supported in the rear part of the shovel will bear against the guard plate and not against the forward part of the conveyer apron, as would be the case if the guard plate were absent. Thus any scraping or grinding action resulting from the upward and rearward movement of the material in the rear part of the shovel is exerted upon the guard plate and not upon the conveyer apron. The guard plate may be made thick enough to endure this scraping or grinding during a long period. This permits driving the conveyer belt at a relatively low speed and making the upward movement of the shovel rapid.

It is to be observed that the rear end of the shovel is open and unobstructed for the discharge of material when the shovel is turned upward on its hinge axis to the chosen inclination. It is desirable to turn the shovel through as small a range as will effect the discharge of the material. For this reason it is desirable that the floor of the shovel have continuity of form from its middle region to its rear edge, as shown by the drawings, in order that material in the rearmost part of the shovel will be supported on a face which will be amply steep when the shovel is turned upward to its limit, and in order that material resting in the middle region of the shovel will have a free and unobstructed course for sliding entirely out of the shovel.

At each side of the shovel the adjacent link, $G^{38}$, extends between the ears, $E^2$, and a pintle, $E^{12}$, extends through said ears and said link to couple said members to each other.

The power mechanism for turning the shovel on the axial line of the shaft, $E^3$, is under the control of the operator. As already described, by means of the hand lever, $G^{26}$, the clutch members, $G^9$ and $G^{10}$, are engaged with each other for the rotation of the shaft, $G^{25}$. The rotation of said shaft transmits motion to the cranks, $G^{34}$, whereby the pitman, $G^{35}$, is reciprocated. The proportions of the various parts are such as to cause the shovel to go through an oscillation during one rotation of said cranks, the lower position of the front of the shovel being near or on the floor level (according to the contour of the floor) and the upper position of the front of the shovel being high enough to give the shovel floor such inclination as will cause material resting on the shovel to slide by gravity downward upon the conveyer.

To put the shovel beneath material, the operator applies power through the hand lever, $F^{20}$, to drive the entire machine body forward when the shovel is in its lower position. It will be seen that such bodily forward movement is necessary only when the shovel is in its lower position and no material rests upon it. In some situations material may slide or roll downward from a mass upon the shovel when the latter returns to its lower position while the body of the machine is stationary.

The members, $G^{35}$, $G^{37}$ and $G^{38}$, between the cranks, $G^{34}$, and the ears, $E^2$, of the shovel constitute a jointed or foldable tension structure adapted to act upon the shovel during rearward movement of said structure and to leave the shovel free to remain above its lower limit—the limit established by the length of the tension structure—when material in the path of the descending shovel or an elevation in the floor arrests the downward movement of the shovel. Thus the shovel is positively raised by the power mechanism and allowed to descend by gravity until the tension structure is put under tension. In other words, the members connecting the cranks and the shovel serve to raise the shovel to its upper limit and to arrest the shovel when the lower limit of its free downward movement by gravity has been reached.

It is also to be observed that the axial line on which the shovel is hinged is close to the floor, and thereby the shovel is approximately horizontal when in its lower position—its position for taking material from the floor. This position is best for the taking of material, for it permits the easy sliding of the shovel beneath the material. Furthermore, this permits the shifting of the shovel through the least range to bring it into the required inclination to allow the material to discharge from the shovel by sliding over the shovel floor.

I claim as my invention,

1. In a machine of the nature described, the combination of a conveyer hinged on a horizontal axis to the body of the machine rearward of its forward end and having its forward end extending forward of the body of the machine and near the floor level, a shovel hinged to said end of the conveyer on an axial line which is horizontal and transverse to the conveyer and is stationary relative to the conveyer, and operator-controlled power means for turning the shovel upward and permitting it to descend by gravity to a chosen position and there arresting and supporting the shovel, substantially as described.

2. In a machine of the nature described, the combination of a conveyer hinged on a horizontal axis to the body of the machine rearward of its forward end and having its forward end extending forward of the body of the machine and near the floor level, a shovel hinged to said end of the conveyer on an axial line which is horizontal and transverse to the conveyer and is stationary relative to the conveyer, operator-controlled power means for turning the shovel upward and permitting it to descend by gravity to a chosen position and there arresting and supporting the shovel, and operator-controlled power means for propelling the machine forward and backward, substantially as described.

3. In a machine of the nature described, the combination of a conveyer having its forward end near the floor level and said conveyer comprising an endless apron, a shovel hinged to the front of the conveyer, a transverse guard plate between the endless apron and the shovel and concentric to the shovel axis, and means for turning said shovel on its hinge from the position for taking material to the position for discharging material, substantially as described.

4. In a machine of the nature described, the combination of a conveyer frame having its forward end near the floor level, an endless apron, rotary supporting means for the forward part of the apron, a transverse guard plate concentric with said apron supporting means, a shovel located in front of the guard plate and hinged to the conveyer frame on the axial line of said supporting means, and means for turning said shovel on its hinge from the position for taking material to the position for discharging material upon the conveyer, substantially as described.

5. In a machine of the nature described, the combination of a conveyer frame having its forward end extending forward of the body of the machine and near the floor level, of a shovel hinged to said end of the conveyer frame on a relatively fixed hinge and having its rear end open and having its floor of substantially continuous form from its middle region to its rear edge and in a plane passing near said hinge, substantially as described.

6. In a machine of the nature described, the combination of a conveyer having its forward end extending forward of the body of the machine and near the floor level and said conveyer comprising an endless apron, of a shovel hinged by its rear to said end of the conveyer and having its rear end open and having its floor of substantially continuous form from its middle region to its rear edge; and a transverse guard plate located between the endless apron and the rear edge of the shovel, substantially as described.

7. In a machine of the nature described, the combination of a conveyer hinged on a horizontal axis to the body of the machine rearward of its forward end and having its forward end extending forward of the body of the machine and near the floor lever, a shovel hinged by its rear to said end of the conveyer on an axial line which is stationary relative to the conveyer, operator-controlled power mechanism comprising a shaft, cranks on the shaft and jointed pitman mechanism between the cranks and the shovel, power mechanism for turning the shovel alternately from the position for taking material to the position for discharging material upon the conveyer, and operator-controlled power mechanism for propelling the machine bodily forward and backward, substantially as described.

8. In a machine of the nature described, the combination of a conveyer hinged on a horizontal axis to the body of the machine rearward of its forward end and having its forward end extending forward of the body of the machine and near the floor level, a shovel hinged to said end of the conveyer on an axial line which is stationary relative to the conveyer, operator-controlled power mechanism comprising worm gearing and a crank-shaft engaged by said worm gearing for turning the shovel alternately from the position for taking material to the positon for discharging material from the conveyer, and operator-controlled power mechanism for propelling the machine bodily forward and backward, substantially as described.

9. In a machine of the nature described, the combination of a conveyer hinged between its ends on an axial line which is horizontal and transverse to the length of the conveyer and the forward end of the conveyer extending forward of the body of the machine and being near the floor level, a shovel hinged to the forward end of the conveyer, on an axial line which is stationary relative to the conveyer, and power transmission mechanism leading to and engaging the shovel and comprising means which are self-adjusting during tilting of the conveyer on said axial line, substantially as described.

10. In a machine of the nature described, the combination of a conveyer hinged between its ends on an axial line which is horizontal and transverse to the length of the conveyer and the forward end of the conveyer extending forward of the body of the machine and being near the floor level, a shovel hinged to the forward end of the conveyer on an axial line which is stationary relative to the conveyer, a horizontal transverse crank shaft on the conveyer, cranks on said shaft, connections between said cranks and the shovel, and power transmission mechanism leading to and engaging said crank shaft and comprising means which are self-adjusting during tilting of the conveyer on said axial line, substantially as described.

11. In a machine of the nature described, the combination of a conveyer hinged between its ends to the rear of the machine body on an axial line which is horizontal and transverse to the length of the conveyer and the forward end of the conveyer being near the floor level, a shovel hinged to the forward end of the conveyer on an axial line which is stationary relative to the conveyer, and power transmission mechanism leading to and engaging the shovel and comprising longitudinal shafts joined by a universal coupling, substantially as described.

12. In a machine of the nature described, the combination of a conveyer hinged on a horizontal axis to the body of the machine rearward of its forward end and extending forward of the body of the machine and having its front end near the floor level and said conveyer including an endless apron, a bearing supported by the conveyer frame at each side of the endless apron, said bearings being on an axial line which is horizontal and transverse to the length of the conveyer, a shaft resting in said bearings and having its ends projecting through said bearings, rollers on said axial line and supporting said apron, a shovel in front of the conveyer and having a width approximately equal to the width of the conveyer frame, and said shovel having ears offset laterally and extending rearward and surrounding said shaft at the outer side of each of said bearings, operator-controlled power means for turning the shovel alternately from the position for taking material to the position for discharging material upon the conveyer, and operator-controlled power mechanism for propelling the machine bodily forward and backward, substantially as described.

13. In a machine of the nature described, the combination of a conveyer extending forward of the body of the machine and having its front end near the floor level and said conveyer including an endless apron, an elongated bearing supported by the conveyer frame at each side of the endless apron, said bearings being on an axial line which is horizontal and transverse to the length of the conveyer, a shaft resting in said bearings and having its ends projecting through said bearings, rollers surrounding said bearings and supporting said apron, a shovel in front of the conveyer and having a width approximately equal to the width of the conveyer frame and said shovel having ears offset laterally and extending rearward and surrounding said shaft at the outer side of each of said bearings, operator-controlled power means for turning the shovel alternately from the position for taking material to the position for discharging material upon the conveyer, and operator-controlled power mechanism for propelling the machine bodily forward and backward, substantially as described.

14. In a machine of the nature described, the combination of a conveyer extending forward of the body of the machine and having its front end near the floor level and said conveyer including an endless apron, a bearing supported by the conveyer frame at each side of the endless apron, said bearings being on an axial line which is horizontal and transverse to the length of the conveyer, a shaft resting in said bearings and having its ends projecting through said bearings, rollers on said axial line and supporting said apron, slanting side plates curved forward and downward concentric to said shaft, a shovel hinged on said axial line and having its rear edge conforming to said apron and said slanting plates, a shovel in front of the conveyer and having a width approximately equal to the width of the conveyer frame, and said shovel having ears extending rearward and surrounding said shaft at the outer side of each of said bearings, operator-controlled power means for turning the shovel alternately from the position for taking material to the position for discharging material, and operator-controlled power mechanism for propelling the machine bodily forward and backward, substantially as described.

15. In a machine of the nature described, the combination of a horizontal truck, a stationary superstructure on said truck, a drive shaft in said superstructure, clutch-controlled gearing connecting said shaft with one of the truck axles, a movable superstructure located on said stationary superstructure and swiveled on an upright axis, a conveyer hinged to the movable superstructure, a shovel hinged to the forward part of the conveyer on a relatively fixed axis, operator-controlled power mechanism extending from said drive shaft to said shovel for turning the shovel alternately from the position for taking material to the position for discharging material, and operator-controlled power mechanism for propelling the machine bodily forward and backward, substantially as described.

In testimony whereof I have signed my name, this 6th day of September, in the year one thousand nine hundred and nineteen.

WILLIAM WHALEY.